(No Model.)  9 Sheets—Sheet 1.

H. J. HYAMS.
PROPORTIONAL GAS METER.

No. 413,670.  Patented Oct. 29, 1889.

WITNESSES  INVENTOR.

(No Model.) 9 Sheets—Sheet 2.

H. J. HYAMS.
PROPORTIONAL GAS METER.

No. 413,670. Patented Oct. 29, 1889.

WITNESSES
N. L. Gill
C. M. Clarke

INVENTOR.
Hyam J. Hyams
by W. Bakewell & Sons
his Attorneys (No Model.) 9 Sheets—Sheet 3.

H. J. HYAMS.
PROPORTIONAL GAS METER.

No. 413,670. Patented Oct. 29, 1889.

WITNESSES
N. L. Gill.
O. M. Clarke.

INVENTOR.
Hyam J. Hyams
by W. Bakewell & Sons
his Attorneys (No Model.) 9 Sheets—Sheet 4.

H. J. HYAMS.
PROPORTIONAL GAS METER.

No. 413,670. Patented Oct. 29, 1889.

WITNESSES

INVENTOR.

(No Model.)  9 Sheets—Sheet 5.

H. J. HYAMS.
PROPORTIONAL GAS METER.

No. 413,670.  Patented Oct. 29, 1889.

WITNESSES
H. L. Gill.
O. M. Clarke

INVENTOR.
Hyam J. Hyams
by W. Bakewell & Sons
his Attorneys.

(No Model.)  9 Sheets—Sheet 7.

H. J. HYAMS.
PROPORTIONAL GAS METER.

No. 413,670.  Patented Oct. 29, 1889.

Fig. 17

WITNESSES  INVENTOR.

(No Model.) 9 Sheets—Sheet 8.

H. J. HYAMS.
PROPORTIONAL GAS METER.

No. 413,670. Patented Oct. 29, 1889.

WITNESSES
H. L. Gill
O. M. Clarke

INVENTOR
Hyam J. Hyams
by W. Bakewell & Sons
his Attorneys (No Model.) 9 Sheets—Sheet 9.

H. J. HYAMS.
PROPORTIONAL GAS METER.

No. 413,670. Patented Oct. 29, 1889.

WITNESSES
H. L. Gill.
O. M. Clarke.

INVENTOR.
Hyam J. Hyams
by W. Bakewell & Sons
his attorneys

N. PETERS, Photo-Lithographer, Washington, D. C.

UNITED STATES PATENT OFFICE.

HYAM J. HYAMS, OF PITTSBURG, PENNSYLVANIA.

PROPORTIONAL GAS-METER.

SPECIFICATION forming part of Letters Patent No. 413,670, dated October 29, 1889.

Application filed November 5, 1888. Serial No. 289,978. (No model.)

*To all whom it may concern:*

Be it known that I, HYAM J. HYAMS, of Pittsburg, in the county of Allegheny and State of Pennsylvania, have invented a new and useful Improvement in Gas-Meters; and I do hereby declare the following to be a full, clear, and exact description thereof.

My invention is designed to provide a meter which is adapted to measure the gas passing therethrough by measuring not the gross volume of such gas, but a certain proportion thereof, the part measured bearing a fixed ratio to the gross amount, so that by observing the quantity measured the whole volume can be easily ascertained.

I shall describe my invention with reference to the accompanying nine sheets of drawings, in which—

Like symbols of reference indicate like parts in each.

Figure 2:
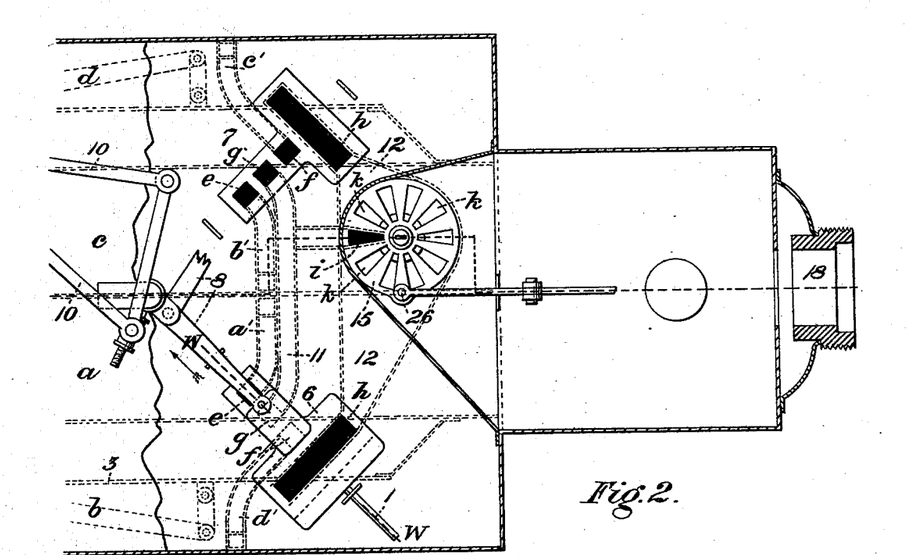
Fig. 2 is a horizontal cross-section on the lines II II of Figs. 1 and 20.
Figures 20, 21, 22:
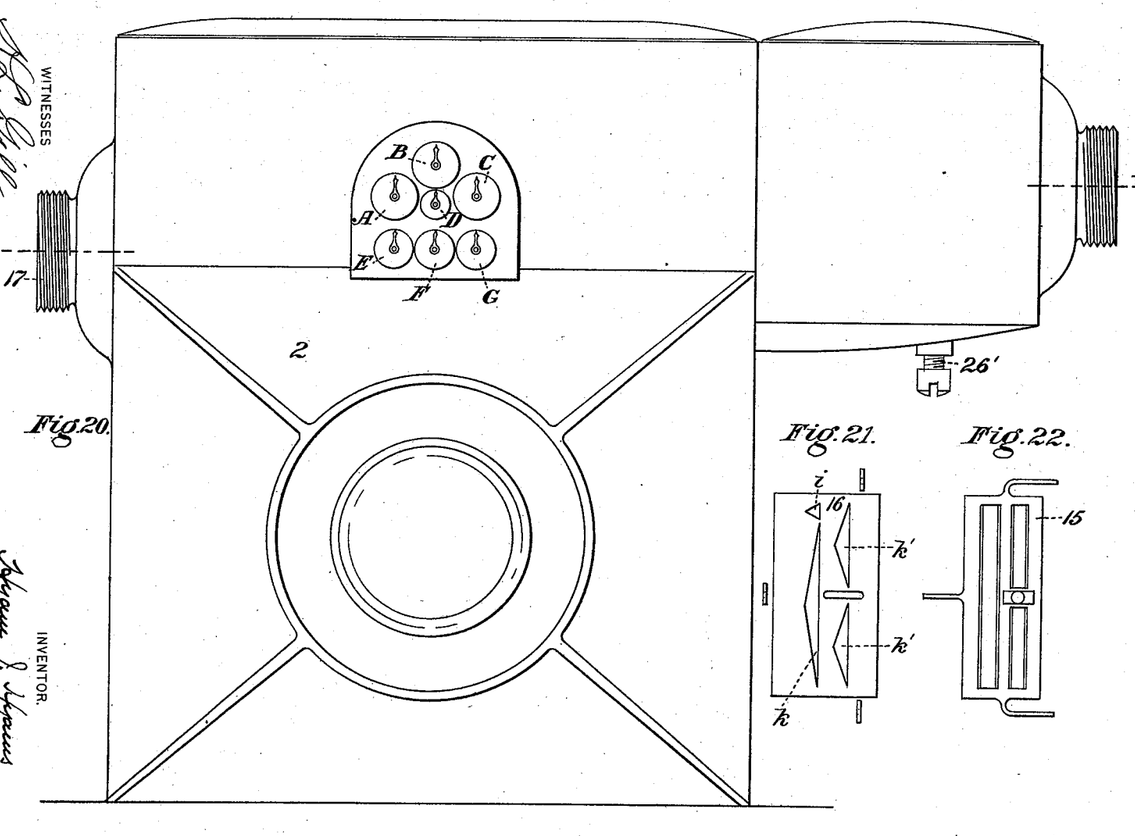
Fig. 20, Sheet 9, is a front elevation of the entire meter.
Figs. 21 and 22 are plan views of modified forms of the regulating-valve and its seat, Fig. 21 representing the valve-seat, and Fig. 22 the valve.

In the drawings, Fig. 20, 2 represents the measuring-chamber, in which are placed the usual diaphragms by which the mechanism of the meter is operated. The construction of these diaphragms and their arrangement within the measuring-chamber are similar to the construction and arrangement of the corresponding parts employed in the ordinary gas-meter, and I have therefore not illustrated them in detail in the drawings. They are, however, indicated in Figs. 2 and 11.

3 and 4 represent the diaphragms by which the measuring-chamber is divided into four parts $a$, $b$, $c$, and $d$.

Figure 1:
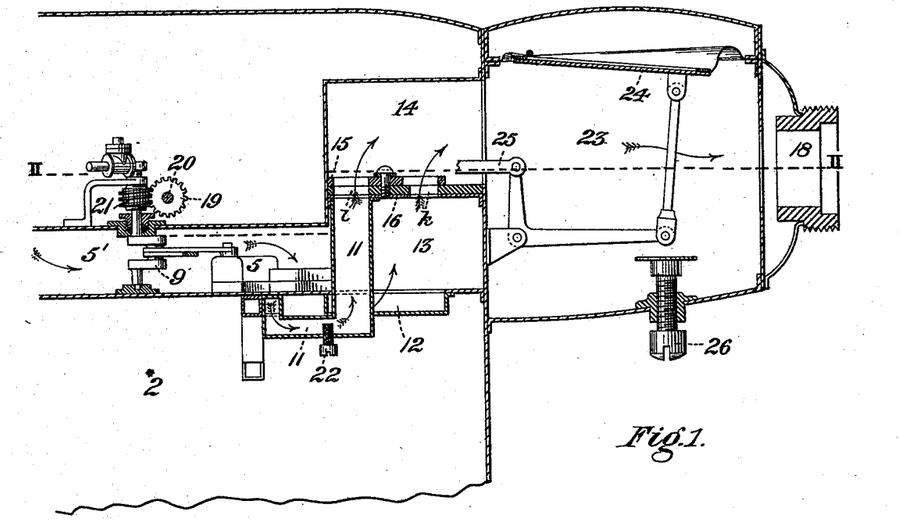
Figure 1, Sheet 1, is a vertical sectional view of that part of my improved meter which contains the valves and the operating mechanism moved by the diaphragms and actuating the dials or indicators.
Figures 12, 13, 14, 15, 16:
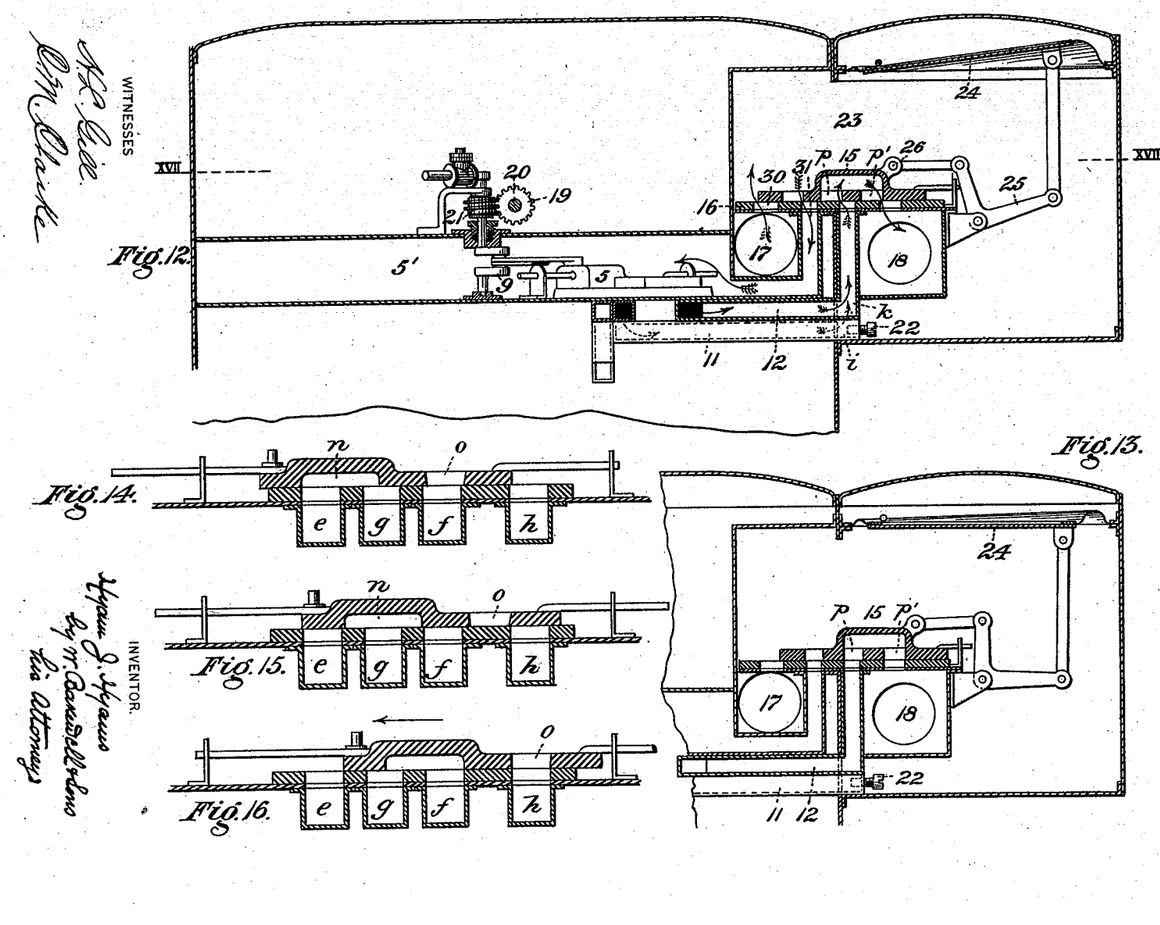
Fig. 12, Sheet 6, is a vertical section of a fourth modified form of the meter, the section being on the line XII XII of Fig. 17.
Fig. 13 is a view similar to Fig. 12, showing the regulating-valve in an altered position.
Figs. 14, 15, and 16, Sheet 6, are vertical longitudinal sections on the line XIV XIV of Fig. 2, showing the meter-valve in three different positions relatively to its valve-seat.

Above the measuring-chamber 2 is another chamber 5', Fig. 1, containing the sliding valves 5 and 6, by which the passage of gas into the chambers $a$, $b$, $c$, and $d$ is controlled. These valves are similar in construction, and are illustrated in Figs. 1 and 2 and in the enlarged sectional views Figs. 14, 15, and 16. They are operated by pitmen 8 from a rotary crank 9, which is rotated by the diaphragms, which act thereon through the usual connecting-levers 10, as shown in Figs. 1 and 2. As shown in the drawings, the valves are quartered, so that they shall reciprocate simultaneously in opposite directions, and they are guided in their motions by arms 1 on the valves, which work in guide-loops, as shown in Fig. 2. If desired, a greater number of valves and of diaphragms than I have shown may be employed, and the valves may be materially altered in form and arrangement—*e. g.*, a rotary valve may be substituted for the sliding valves. Fig. 2 shows one of the valves 6 in plan view. The other valve 5 is not shown, the purpose of its omission being to illustrate the valve-seat, which is thus exposed. In the seat of each valve opening into the chamber 5' there are four ports $e$ $f$ $g\ h$, the ports $e\ e$ and $f\ f$ communicating through passages $a'$, $b'$, $c'$, and $d'$ with the chambers $a$, $b$, $c$, and $d$, respectively, the ports $g\ g$ opening into a passage 11, which communicates through a regulating-chamber 14 with the eduction or delivery pipe 18 of the meter, and the ports $h\ h$ communicating with the said regulating-chamber through passages 12 and a passage 13. As shown in Fig. 14, each valve has an open slot or passage $o$, which is designed to move over the port $f$ and to expose it to the gas in the chamber $5'$, and a passage $n$, which serves to connect alternately the ports $e\ g$ and $g\ f$. The different positions which are assumed by the valves are clearly shown in Figs. 14, 15, and 16. The adits of the passages 11 and 12 into the regulating-chamber 14 are controlled by a regulating-valve 15.

In Figs. 1 and 2, $i$ represents the port or opening in a valve-seat 16, which connects the passage 11 with the chamber 14, and $k\ k$ represent the ports which connect the passages 12 and 13 with the said chamber. These ports are arranged circularly, and are controlled by a rotary disk-valve 15, the construction of which is clearly illustrated in the figures of the drawings before referred to. I have illustrated nine of the ports $k$ and one port $i$, so that approximately an opening of nine times greater area is afforded for the entrance of gas through the passages 12 and 13 into the chamber 14 than is afforded for the entrance of gas from the passage 11 into said chamber, and for a like purpose the valve-ports $h$ are made larger than the ports $e\ f\ g$, as illustrated in Fig. 2. In practice I find it desirable, in order to preserve this ratio in the volumes of gas passing through the respective ports $i$ and $k$, to make the port $i$ a little larger than any of the ports $k$, because the gas which passes through this port is that which has been utilized in operating the meter-diaphragms, and has therefore spent a portion of its energy, and passes through the port $i$ at less velocity than the gas which passes through the ports $k$.

The operation of the parts of the meter which I have just described is as follows: The gas to be measured enters the chamber $5'$ through the induction-pipe 17. If, now, the valve 6 be in the position shown in Figs. 2 and 16, the ports $e$ and $h$ being exposed and the ports $g$ and $f$ being connected by the passage $n$ in the sliding valve, the gas descends through the port $e$ and through the connecting-pipe $a'$ into the diaphragm-chamber $a$ and expands the diaphragms 3, thus expelling the gas from the adjoining chamber $b$, which passes through the ports $g$ and $f$ into the passage 11, leading to the chamber 14, and thence from said chamber through the eduction-pipe 18 to the service-pipes. The continued motion of the diaphragms rotates the crank-shaft 9, and thereby moves the slide-valve 6 in the direction of the arrow in Figs. 2 and 16, gradually closing the ports $e$ and $h$, as shown in Fig. 15, and finally connecting the ports $e$ and $g$ and opening the ports $f$ and $h$, as shown in Fig. 14. This reverses the motion of the diaphragm 3, and the gas then enters the chamber $b$ through the port $f$ and passes from the chamber $a$ through the ports $e$ and $g$, passage 11, and chamber 14 to the eduction-pipe, and also from the chamber $5'$ directly through the port $h$ and passages 12 and 13 into the chamber 14 to the eduction-pipe. The port $g$ therefore acts always as an eduction-port. The port $h$ acts alternately in unison with the ports $e$ and $f$ as an eduction-port; but it will be noticed that the gas which passes through the port $h$ does not enter the measuring-chamber 2 of the meter. The passages 12 and 13 therefore constitute a by-pass. The valve 5 operates in connection with the chambers $c$ and $d$ in a manner similar to the operation of the valve 6 with the chambers $a$ and $b$, and therefore needs no further detailed description. The valves 5 and 6 operate alternately, as do also the diaphragms which they control, the purpose of employing two diaphragms and two valves being to render the meter steady in its action and to prevent the alternate pulsations or intermissions of the flow of gas which would occur if only one diaphragm and slide-valve were used. The rotation of the crank-shaft 9 which is induced by the operation of the diaphragms just described rotates a pinion 19, which is keyed to a shaft 20 and is in gear with a worm 21 on the shaft 9. The shaft 20 is connected with the dial-indexes of the meter, and the extent of its rotation indicates the volume of gas which has passed through the measuring-chamber; and in order to keep the pinion, worm, and the diaphragm-levers 10 out of direct contact with the gas, they are preferably arranged in a chamber directly above the chamber $5'$ and separated therefrom by a partition, the crank-shaft passing through a stuffing-box in this partition.

As before stated, the gas which passes through the ports $h\ h$ bears a certain ratio to the gas passed through the ports $e$, $f$, and $g$ and through the measuring-chamber. In the apparatus as illustrated in the drawings this ratio is as nine to one, though by varying the number or relative size of the ports $i$ and $k$ and their supply-passages any other ratio can be established; and in order to provide means for delicately adjusting the relative volumes of gas passed through the measuring-chamber and by-passage, I provide a valve 22, consisting, preferably, of an adjusting-screw, which enters the passage 11, and which, by being projected to a greater or less extent into this passage, will decrease or increase the volume of gas capable of passing through the measuring-chamber. The dial-indexes of the meter are moved primarily by the gas passing through the measuring-chamber alone, and, if desired, the dials may be graduated so as to indicate in figures the cubic volume of gas passing through the measuring-chamber, the gross amount passing through the meter being ascertained by multiplying this sum by the number expressing the ratio between the port $i$ and the total number of ports $i$ and $k$ in the apparatus illustrated, this number being ten. I prefer, however, to graduate the dials A B C D to indicate the gross amount of gas passed through the meter and to employ a second set of dials E F G, the indexes of which are in gear with the mechanism of the indexes of the other dials, so that the second set shall indicate truly the volume of gas passed through the measuring-chamber.

The advantages of the use of a meter constructed to pass a certain proportion only of the gas through the measuring-chamber and pass the remainder through a by-passage are that it enables me to measure, with all the accuracy necessary for practical purposes, large volumes of gas, the amount of which would otherwise require the use of excessively large and expensive meters. The meter is therefore well adapted for use in the measurement of natural gas or other gas used in large quantities for heating purposes and the like.

While the construction of a meter with a by-passage through which a certain proportion of the volume of gas passes without influence on the measuring apparatus, and the construction of such a meter with a valve or valves to control the by-passage, which valves are integral with or actuated simultaneously with the valves controlling the gas passing through the measuring-chamber, (e. g., the valves 5 and 6,) is of my invention, I have in addition thereto devised certain valuable improvements, forming a main feature of my invention, which I intend to cover by the claims of this patent, distinct from and unlimited by the use of the valves 5 and 6 or their equivalents. I have found that in using a meter constructed as described above there is a practical difficulty which arises from the fact that when the escape-orifice of the gas on the delivery side of the meter is partially closed, as if some of the burners in the service-pipe of a building be shut off by turning down the cocks, there is an increased pressure on the delivery side of the meter, which tends to obstruct the working of the diaphragms of the measuring-chamber, and which therefore alters the predetermined ratio of volumes of gas passing through the measuring-chamber and by-passage, allowing a relatively greater volume to pass through the latter. I have discovered, however, that this may be prevented by employing a regulating device, which, as the pressure on the delivery side of the meter decreases, contracts the area of opening of the delivery-passage of the measuring-chamber and the by-passage in substantially the same degree, and it is in this that my invention consists. When such an auxiliary to the apparatus is employed, the ratio of volumes delivered by the two parts of the apparatus remains constant. I have illustrated this in Figs. 1 and 2. Between the chamber 14 and the eduction-pipe 18 is a chamber 23, containing a diaphragm or equivalent pressure-regulating device 24, (any suitable regulator may be employed,) which is connected by arms and levers 25 with a pin 26 on the valve 15. The valve is so set on its seat relatively to the normal position of the diaphragm that when the diaphragm is upheld by gas at the normal pressure at which the apparatus is designed to operate the ports $i$ and $k$ shall be opened to their full extent, as shown in Fig. 1. If back-pressure should be created in the chamber 23 by reason of turning down of the cocks of some of the burners in the service-pipes, or for any other reason, the diaphragm 24 is raised, and through the resulting motion of the arms and levers 25 rotates the valve 15, so as to contract the opening of all the ports $i$ and $k$, and if the pressure should rise to a high degree these openings would be almost or entirely shut off. If, after the creation of such back-pressure, the pressure in the chamber 23 should fall by reason of the opening of burner-cocks, the diaphragm 24 drops, thus effecting a reverse rotation of the valve 15 and opening all the ports $i$ and $k$. If, however, the pressure should fall below the normal pressure at which the apparatus is designed to operate, as if the pressure of gas supplied to the meter should from any cause diminish, or if an unusually large outlet-opening be afforded to the gas at the burners, the further descent of the diaphragm will cause the valve 15 to contract the openings $i$ and $k$, and if such decrease in pressure should be very considerable, falling below the pressure required to work the measuring-diaphragms of the meter, the diaphragm will drop sufficiently far to close these openings altogether. The reason for thus constructing the apparatus so as to contract the ports $i$ and $k$ on excessive diminution of pressure in the gas-supply is that as the pressure diminishes there may not be sufficient power in the gas to operate the meter-diaphragms properly, and an undue proportion of gas would in such case pass through the by-passage. When, however, the openings $i$ and $k$ are contracted, a back-pressure in the measuring-chamber is created, thus affording the power necessary to work the diaphragms, and therefore preserving the ratio between the volumes of gas from the measuring-chamber and from the by-passage. The openings are closed altogether when the pressure supplied to the meter becomes too small to be effective, and in such case it would remain closed until the pressure is restored and the valve opened. The diaphragm 24 may be adjusted to hold the valve open at any desired pressure of gas by applying weight thereto in the usual manner. The limit of its downward motion is determined by adjustment of a set-screw or other similar stop 26', and this screw may, if desired, be projected into the chamber sufficiently to prevent the diaphragm from dropping far enough to close the valve altogether.

The apparatus illustrated in Figs. 1 and 2 is well adapted for the uses which I have described. It is, however, susceptible of many modifications in form and arrangement of the parts without involving a departure from the essential features of my invention, which are, first, the use of a by-pass in a meter; second, the use of a meter having a by-passage in combination with pressure-regulating mechanism—such as the diaphragm 24—for regulating the volume of gas from the measuring-chamber and from the by-passage, and, third, the controlling of the flow of gas into the measuring-chamber and through the by-passage by the same valves or connected valves, these inventions being, as before stated, in a manner separate from each other and separately claimed.

For the purpose of indicating to those skilled in the art, as illustrations, some of the many modifications of which the apparatus is susceptible, I have made the figures contained in Sheets 2 to 9 of the drawings, and I shall now describe them.

Figure 3:
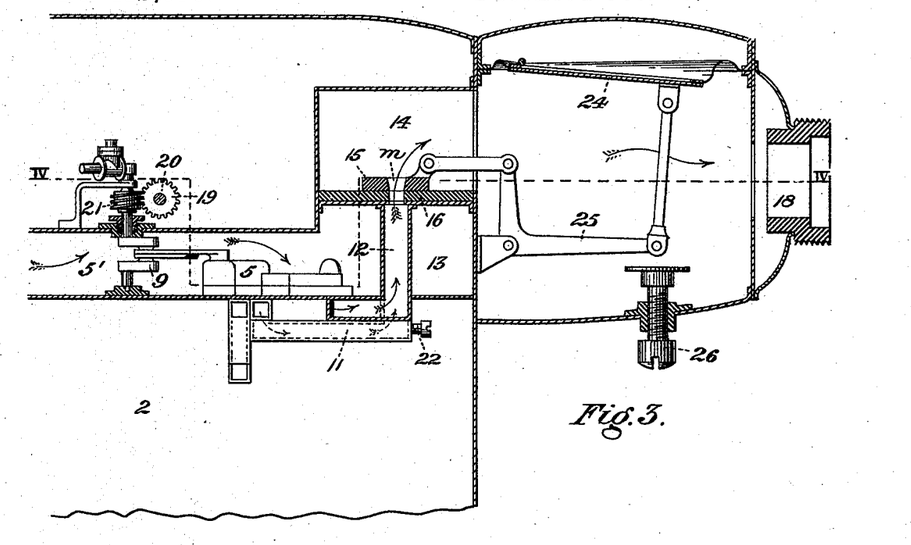
Fig. 3, Sheet 2, is a view similar to Fig. 1, illustrating a modified form of the apparatus.
Figure 4:
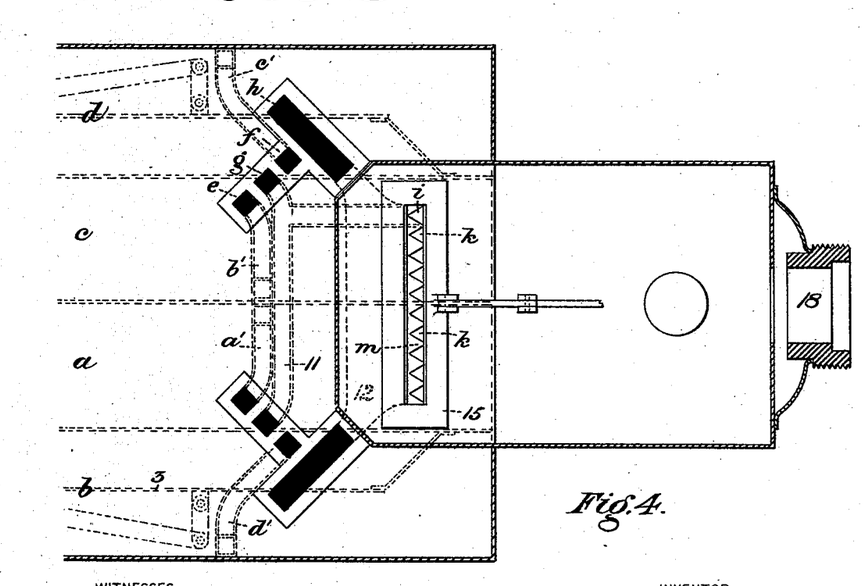
Fig. 4 is a horizontal cross-section on the line IV IV of Fig. 3.

Referring to Sheet 2, the apparatus there illustrated is the same as that which is shown in Sheet 1, except that the form of the valve 15 is altered, and as a consequence the form of the chamber or passage 13 is correspondingly altered. In the figures on Sheet 2 I show, instead of a rotary valve 15, a horizontally-reciprocating sliding valve provided with a single straight slot or passage $m$, which is designed to afford a passage from all the ports $i$ and $k$. These ports are arranged in a straight row in the valve-seat 16, and the diaphragm 24 is connected with the valve in such manner as to reciprocate it on its seat, as illustrated in the drawings. The several ports are preferably made triangular in shape, so that the valve shall act more quickly in cutting off the gas, though this is not essential. The diaphragm and valve are shown in the positions which they occupy when the pressure is normal. If the pressure increases, the valve is moved so as to contract the openings in the valve-seat, and as it decreases the valve is moved to enlarge these openings until the normal pressure is reached, at which time further decrease in pressure causes the openings to contract by reason of the passage of the rear side of the sliding valve over the ports.

Figures 5, 6, 7:
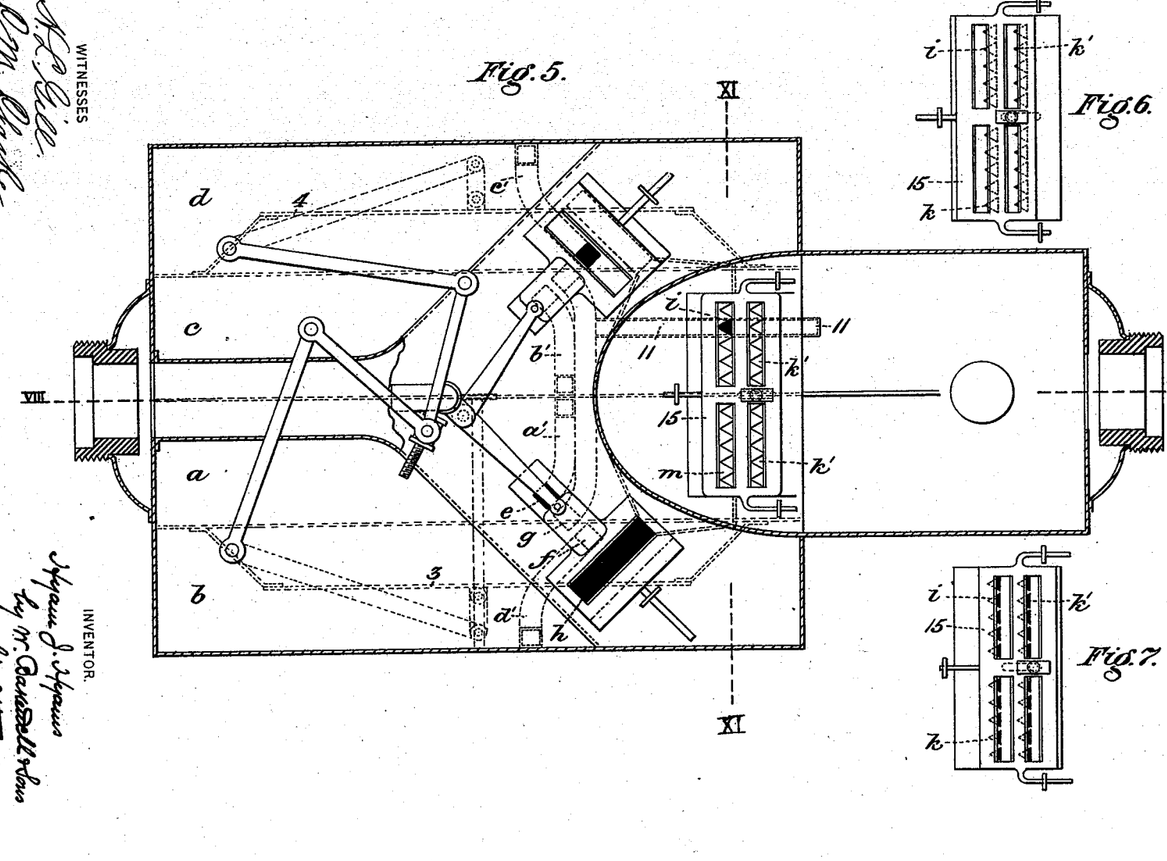
Fig. 5, Sheet 3, is a horizontal sectional view of a second modified form of the apparatus, the section being taken on the line V V of Fig. 8.
Figs. 6 and 7 are views of the regulating-valve of Fig. 5, the ports of the valve being shown nearly closed in Fig. 6 and more nearly open in Fig. 7.
Figure 8:
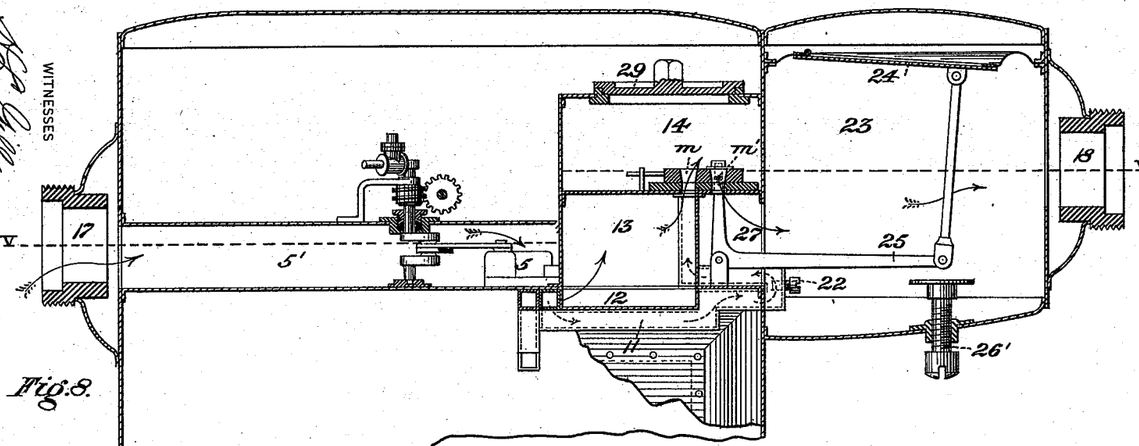
Fig. 8, Sheet 4, is a vertical cross-section on the line VIII VIII of Fig. 5.
Figure 9:
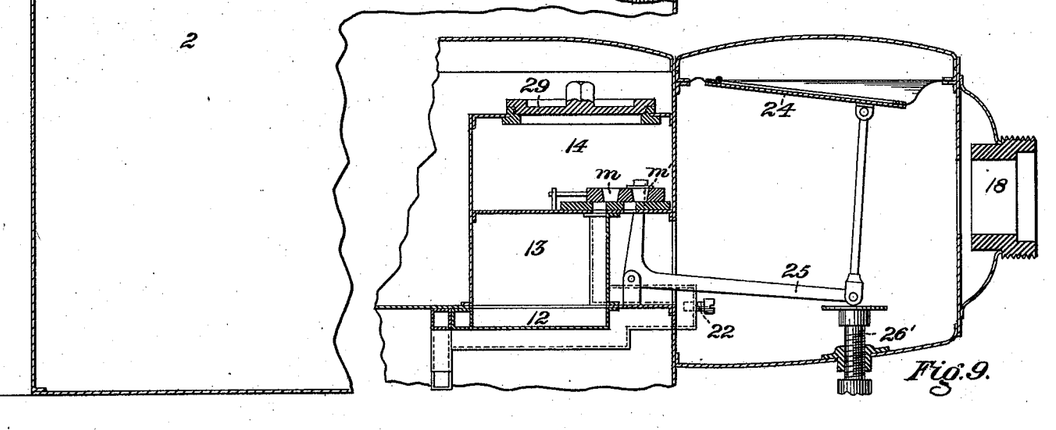
Fig. 9 is a similar section showing the parts in an altered position.

In the modification illustrated in Sheets 3 and 4 the construction of the apparatus is similar to that shown in Figs. 3 and 4, except that the regulating-valve 15 is altered in construction. Instead of employing a single row of ports $i$ and $k$, as in the latter figures, I employ two parallel rows of such ports, a row of ports $i$ and $k$, and a second row of ports $k'$, there being, as before, only one port $i$, which communicates with the passage 11. The valve 15 moves over the ports in a manner similar to that illustrated in Fig. 3, and has two slots or two rows of slots $m$ and $m'$, one for each of the rows of ports. The chamber 14 above the valve 15 does not communicate with the chamber 23 directly, but is divided therefrom by a partition, and there is a chamber 27, which is connected with the chamber 14 by the row of ports $k'$, and which communicates freely with the chamber 23. When the ports $i$ $k$ and $k'$ are open, as shown in Figs. 5 and 8, the gas passes from the passages 11 and 13 up through the ports $i$ and $k$ into the chamber 14, and thence through the ports $k'$ into the chamber 27, from whence it passes through the chamber 23 to the eduction-pipe. As the pressure in the chamber 23 varies, this double valve 15 is moved, as before described with reference to Figs. 3 and 4, so as to open or close both lines of ports at the same time and to the same degree. Thus Fig. 9 shows all the ports closed. Fig. 5 shows them all open, and Figs. 6 and 7 show them partially open. The lever of the valve passes up through a slot in the valve-seat and is fastened to the valve in any suitable manner. The purpose of employing a double valve of this kind is to secure a double regulation of the gas, the effect being to increase the accuracy of the apparatus.

Figure 10:
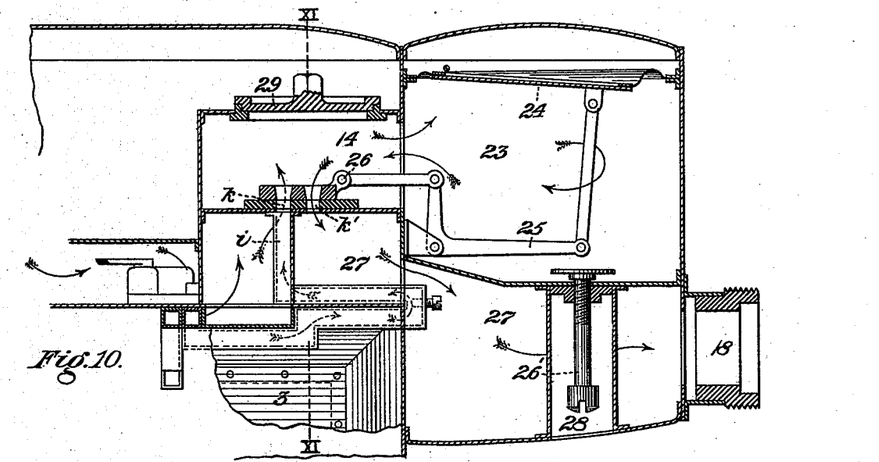
Fig. 10, Sheet 5, is a vertical sectional view of a third modified form of the meter, the section plane being similar to that of the section plane of Fig. 8.
Figure 11:
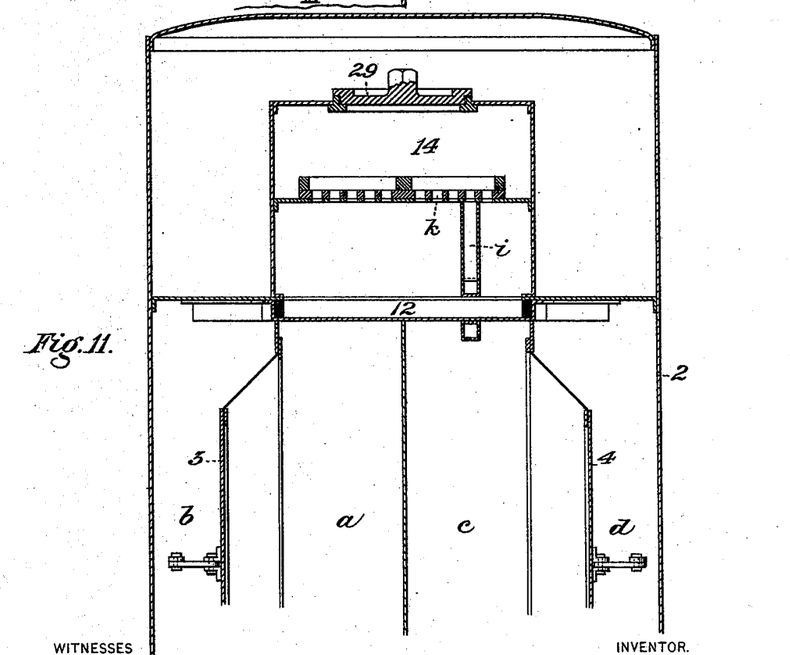
Fig. 11 is a vertical cross-section on the line XI XI of Fig. 10.

The modified form of apparatus shown in Figs. 10 and 11 is similar to that shown in Figs. 8 and 9, except that, instead of operating the diaphragm 24 with the gas after it has passed through both rows of ports $i k$ and $k'$, I introduce the gas into the chamber 23 after it has passed through the first row of ports $i$ and $k$ and before it passes through the port $k'$. The advantage of this is that it increases the efficiency of the diaphragm in controlling back-pressure, and therefore increases the accuracy of the apparatus for measurement and registration. To accomplish this I have no partition between the chambers 14 and 23, but permit the gas to pass from the ports $k'$ into the chamber 27, which in this case is separated from the chamber 23 by a partition and communicates directly with the eduction-pipe 18. In order to render the set-screw 26' of this modification easily accessible, I inclose its stem within a hollow chamber 28, which is set within the chamber 27 and is open at the bottom. In the modification shown in these figures, as well as in the modification shown in Figs. 5, 8, and 9, I prefer to provide the chamber 14 with a removable cap 29, affording easy access for the purpose of adjusting the valve. In the apparatus shown in these figures (5, 8, 9, 10, and 11) the arrangement of the passages connecting the slide-valves 5 and 6 with the valve 15 is modified to suit the altered forms of the apparatus, as clearly illustrated in the drawings.

In the form of apparatus above described the induction and eduction pipes are remote from each other and the gas is not regulated in pressure until after it has passed through the measuring-valves 5 and 6.

Figure 17:
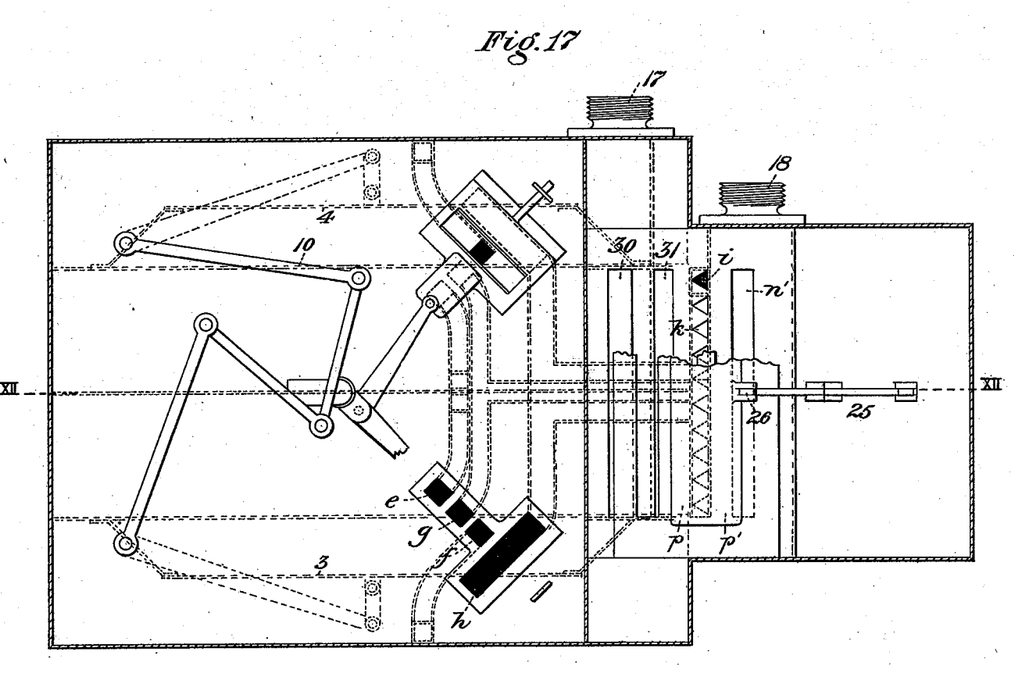
Fig. 17, Sheet 7, is a horizontal section on the line XVII XVII of Fig. 12.

In the form of apparatus shown in Figs. 12, 13, and 17 the gas is regulated by a regulator which operates a valve closing both the adit and exit passages of the meter. The advantage of this construction is that the pressure of gas, if excessive in the main supply-pipe, is reduced in pressure before entering the meter, and thus prevents injurious strain on the mechanism of the latter. In these figures the induction-port 17 opens into a chamber which communicates through a port 30 in a valve-seat 16 directly with the diaphragm-chamber 23; and adjacent to the port 30 is a second port 31, which leads into the chamber 5'. In the valve-seat 16 are the ports $i$ and $k$, which communicate with the by-passage and the measuring-chamber, as before described, and adjacent thereto is a second port $k'$, which opens directly into the outlet or eduction pipe 18. The valve 15, which moves over the several ports 30, 31, $i$, $k$, and $k'$, is preferably a sliding valve, having an open port which moves over the port 31 and controls the orifice, and a rim at the end of the valve, which controls the orifice of the port 30. It also has connected and covered ports $p$ $p'$, which move over and control the ports $i$, $k$, and $k'$, all as clearly illustrated in Figs. 12 and 13. The gas enters the meter through the induction-pipe 17, enters the chamber 23 through the port 30, where it operates on the diaphragm, then passes through the port 31 to the chamber 5', where it is divided, a part passing through the measuring-chamber and a part through the by-passage. From the by-passage and measuring-chamber the gas passes through the ports $i$, $k$, and $p$ $p'$ and through the ports $k'$ to the outlet. The several ports 30, 31, $i$, $k$, and $k'$ are contracted or enlarged by means of the sliding valve 15, which is operated by the pressure in the chamber 23 in the manner which is clearly illustrated in the drawings, and in the manner similar to that described with reference to Figs. 1 and 2.

Figure 18:
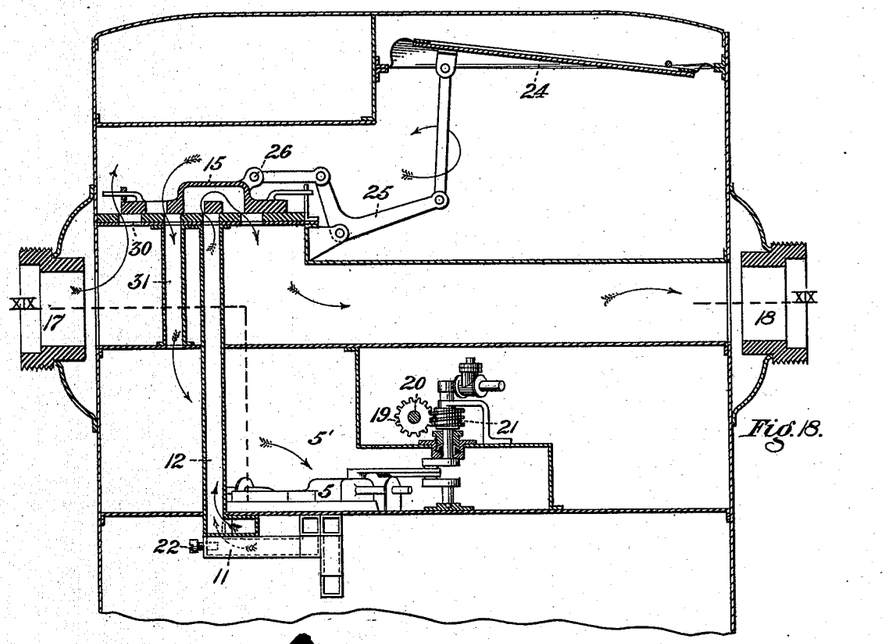
Fig. 18, Sheet 8, is a vertical sectional view of a fifth modification, the section being on the line XVIII XVIII of Fig. 19.
Figure 19:
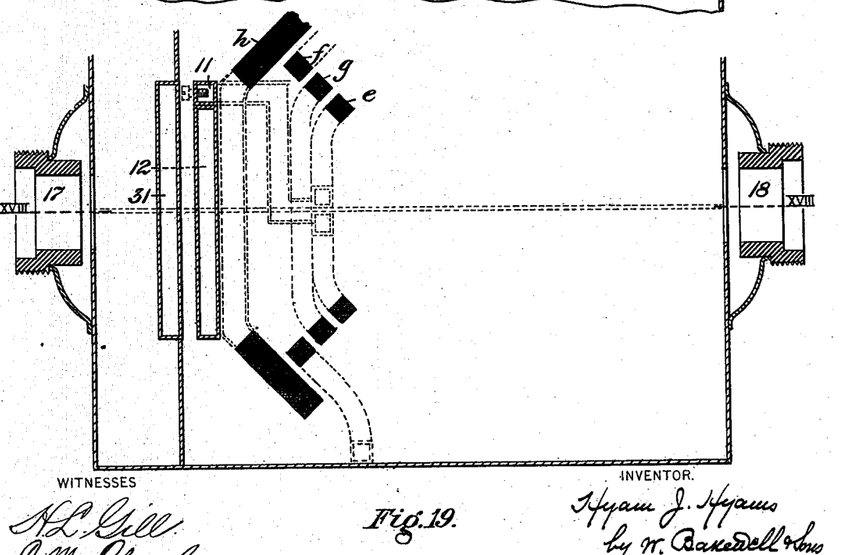
Fig. 19 is a horizontal section on the line XIX XIX of Fig. 18.

The form of apparatus which is illustrated in Figs. 18 and 19 is similar in principle of construction to that shown in Figs. 12, 13, and 17, except that the induction and eduction pipes of the meter are not contiguous and the chamber 5' is located at a lower level within the body of the meter itself. The structural differences which result from the altered location of these parts are clearly shown in the drawings, and need no detailed description. In Figs. 21 and 22 I show a modified form of the valve-seat 16 and valve 15. Here, instead of having one port $i$ and a number of other ports $k$ and $k'$ of substantially equal size as the ports $i$, I employ a single port $i$ and a number of larger ports $k$ and $k'$, the ports $k$ bearing such relation to the port $i$ that a known volume of gas bearing a certain ratio to that passed through the port $i$ will pass through the ports $k$. In the drawings I show one port $k$ adapted to pass about nine times the volume of gas which passes through the port $i$.

From the foregoing description many other modifications in the construction of the apparatus will suggest themselves to those skilled in the art, the features of invention which I desire to cover broadly by this patent being stated in the following claims.

I claim—

1. A gas-meter having a measuring-chamber, a by-passage through which passes gas having a known ratio in volume to the gas passing through the measuring-chamber, and pressure-regulating mechanism controlling the passage of gas through the measuring-chamber and by-passage, said pressure-regulating mechanism being situate on the delivery side of the meter and being subjected to the conjoined pressures of the gas from the measuring-chamber and by-passage, substantially as and for the purposes described.

2. In a gas-meter, the combination of a measuring-chamber, a by-passage through which passes gas having a known ratio in volume to the gas passing through the measuring-chamber, ports affording communication between the by-passage and measuring-chamber, a common eduction-passage, a horizontal sliding valve controlling said ports, a pressure-regulator situate in said common eduction-passage, and a lever connecting the pressure-regulator with the horizontally-moving sliding valve, substantially as and for the purposes described.

3. A gas-meter having a measuring-chamber provided with moving mechanism, such as diaphragms, a by-passage, ports admitting gas into the measuring-chamber and into the by-passage, and a valve or valves which control the said ports and are operated by movement of the said diaphragms, a regulating-valve, and a pressure-regulator coupled to said regulating-valve and operating the same, accordingly as the pressure of gas is varied, substantially as and for the purposes described.

4. In a gas-meter, the combination of the measuring-chamber, a by-passage, a chamber 23, containing a pressure-regulator, ports $i$ and $k$, leading from the by-passage and measuring-chamber into the chamber 23, and a valve or valves connected with the pressure-regulator and controlling the said ports, the said ports and valves being adapted to pass from the measuring-chamber and by-passage volumes of gas bearing a known ratio to each other, and an outlet or eduction pipe leading from the chamber 23, substantially as and for the purposes described.

5. In a gas-meter, the combination of the measuring-chamber, a by-passage, a chamber 23, containing a pressure-regulator, ports $i$ and $k$, leading from the by-passage and measuring-chamber into the chamber 23, a valve or valves connected with the pressure-regulator and controlling the said ports $i\ k$, the said ports and valve being adapted to pass from the measuring-chamber and by-passage volumes of gas bearing a known ratio to each other, the port $i$ being larger in area than that part of the area of the port or ports $k$ which represents that fractional part of the whole volume of gas which is passed through said port $i$, for the purpose of compensating for the resistance of the measuring-chamber, and an outlet or eduction pipe leading from the chamber 23, substantially as and for the purposes described.

6. In a gas-meter, the combination of the measuring-chamber, a by-passage, a chamber 23, containing a pressure-regulator, ports leading from the by-passage and measuring-chamber into the chamber 23, and a valve or valves connected with the pressure-regulator and controlling the said ports, the said ports and valve being adapted to pass from the measuring-chamber and by-passage volumes of gas bearing a known ratio to each other, and the said pressure-regulator being adapted, substantially as described, to cause the valve to close the ports as the pressure increases above the normal, and also to close the same as the pressure decreases below the normal, and an outlet or eduction pipe leading from the chamber 23, substantially as and for the purposes described.

7. A gas-meter having a measuring-chamber, a by-passage through which passes gas having a known ratio in volume to the gas passing through the measuring-chamber, an induction-pipe admitting gas to the measuring-chamber and to the by-passage, an eduction-pipe, and a pressure-regulator having a valve or valves which control the passage of the gas into the said by-passage and measuring-chamber and the passage of the gas from the same, substantially as and for the purposes described.

8. A gas-meter having a measuring-chamber provided with moving mechanism, such as diaphragms, a by-passage, ports admitting gas into the measuring-chamber and into the by-passage, a valve or valves which control the said ports and are operated by movement of said diaphragms, and a pressure-regulator having a valve or valves which control the passage of gas from the measuring-chamber and by-passage, substantially as and for the purposes described.

9. A gas-meter having a measuring-chamber provided with moving mechanism, such as diaphragms, and a by-passage through which passes gas having a known ratio in volume to the gas passing through the measuring-chamber, an eduction-passage, ports through which the by-passage and measuring-chamber communicate with the eduction-passage, and a valve controlling the passage of gas through the ports both of the measuring-chamber and by-passage at the place of communication of the measuring-chamber and by-passage with the eduction-passage, substantially as and for the purposes specified.

In testimony whereof I have hereunto set my hand this 26th day of October, A. D. 1888.

HYAM J. HYAMS.

Witnesses:
W. B. CORWIN,
J. K. SMITH.